2,961,430
UNSATURATED POLYESTER PREPARATION UNDER REDUCED PRESSURE

Sanford Davis, Linden, Henry P. Marshall, New Providence, and Richard E. Davies, Ridgewood, N.J., assignors to Celanese Corporation of America, New York, N.Y., a corporation of Delaware No Drawing. Filed Nov. 1, 1955, Ser. No. 544,356

13 Claims. (Cl. 260—75)

This invention relates to polyesters and relates more particularly to the production of ethylenically unsaturated polyester resins.

As is well known in the art the polyester resins are reaction products of polyhydric alcohols and polycarboxylic acids, the acids often being incorporated into the reaction mixture in the form of their anhydrides. One type of polyester resin is produced by the reaction of a glycol, such as propylene glycol, and an $\alpha,\beta$-ethylenically unsaturated dicarboxylic acid, e.g. maleic acid. The reaction is carried out at an elevated temperature and in an inert atmosphere, which is usually produced by passing an inert gas through the reaction mixture, e.g. by sparging said mixture with carbon dioxide or nitrogen. The resulting soluble polyester resin may be blended with an appropriate proportion (e.g. 0.2 to 9 times its weight) of a liquid copolymerizable monomer such as styrene and the blend copolymerized to form a cross-linked insoluble, infusible resin. Usually the blend of monomer and polyester resin is employed in combination with glass fibers for the formation of laminated and other articles.

In order to lower the cost and to improve the properties of the products made from polyester resins it is common to modify the polyester resin by replacing part of the $\alpha,\beta$-ethylenically unsaturated dicarboxylic acid with another dicarboxylic acid such as phthalic or sebacic acid. When a fire resistant product is desired a chlorinated dicarboxylic acid, for example tetrachlorophthalic acid or chlorendic acid, is used as the modifying acid, but it is found that the use of such chlorinated acids tends to result in dark colored polyester resins when the usual procedural steps are employed. One method which has been suggested for overcoming this discoloration involves very rapid sparging with the inert gas during the reaction. In this manner the time necessary to complete the desired reaction between the acids and the glycol may be reduced considerably and a much lighter colored resin may be produced. On an industrial scale, however, it is difficult and expensive to carry out this process, due to the cost of the large amounts of inert gas which are necessary, the cost of the special equipment which must be installed to force such large amounts of gas through the reaction mixture, and the low yields of the desired resin.

It is therefore an object of this invention to provide a new and economical method for the production of light-colored chlorine-containing polyester resins, which method will be free from the foregoing and other disadvantages.

Another object of this invention is the provision of novel processes for producing polyester resins generally.

Other objects of this invention will be apparent from the following detailed description and claims. In this description and claims all proportions are by weight unless otherwise indicated.

In accordance with one aspect of this invention the polyester resin is produced by reacting a dicarboxylic acid and a glycol at an elevated temperature and under a mild vacuum, e.g. under a subatmospheric pressure above 100 mm. of mercury absolute. The reaction under mild vacuum is generally continued for at least an hour, preferably for several hours. Thereafter the reaction may be continued at elevated temperature but under a relatively high vacuum, e.g. a pressure in the range of about 10 to 35 mm. of mercury absolute. Particularly good results have been obtained by a procedure in which the reaction is started at atmospheric pressure, then a mild vacuum in the range of about 400 to 650, preferably 500 to 600, mm. of mercury absolute is applied and thereafter the pressure on the reaction mixture is reduced gradually, for example in a series of stages, until the mixture is under the relatively high vacuum, the reaction being continued until the desired resin is obtained. The high vacuum is preferably not applied until the acid number of the reaction mixture has been reduced to below about 60. Throughout the reaction the mixture is preferably sparged with an inert gas; a comparatively low rate of sparging is sufficient, although higher sparging rates may be employed if desired.

Comparison between the process of this invention, involving the use of mild vacuum before the final stages of the reaction, and otherwise identical processes in which the mild vacuum is not employed shows that, when the periods of reaction are the same, the process of this invention produces the desired polyester resin at a considerably lower temperature. Conversely, when the temperatures of reaction are the same, the time required for the production of the polyester resin is considerably less when the process of this invention is used. In either case, the use of the process of this invention results in products which are very much lighter in color.

Reaction temperatures in the range of about 160 to 170° C. are preferred, but higher reaction temperatures, e.g. up to about 210° C., may be used if desired. The reaction is generally continued until the acid number of the product is below about 50, preferably about 20 to 30.

Advantageously the pressure on the reaction mixture during the period in which the mild vacuum is used is never reduced to such an extent that there is a substantial loss of glycol or dicarboxylic acid due to evaporation from the reaction mixture. That is, any excess glycol which may be present is not removed until the high vacuum is applied.

This invention finds its greatest utility in the preparation of halogen-containing polyester resins made from glycols, $\alpha,\beta$-ethylenically unsaturated dicarboxylic acids and halogenated dicarboxylic acids. However, it may be applied also, with excellent results, to the preparation of polyester resins generally, using the polyhydric alcohols, polycarboxylic acids and modifying agents well known to the art. It will be understood that the acids may be present as their anhydrides or other ester-forming derivatives, as is conventional, and that references herein to "acids" are intended to cover the corresponding anhydrides and other ester-forming derivatives.

The proportions of the polyester-forming reactants should be such that the number of carboxyl radicals is roughly equal to the number of hydroxyl radicals supplied by said reactants. Preferably, there is a slight excess of hydroxyl radicals. Thus, when the polyhydric alcohol is a glycol, a 2.5 to 15% excess of glycol over the stoichiometric proportions yields very good results.

The reactants may be combined in any desired sequence. For example, when maleic anhydride, phthalic anhydride and propylene glycol are reacted, all of the reactants may be mixed together initially or either of the anhydrides may be reacted with an excess of the glycol, the other anhydride added thereafter.

Particularly good results, in terms of ease of production and quality of final product, are obtained by the use of a novel reaction procedure which constitutes another aspect of this invention. In this novel procedure a dicarboxylic anhydride which is not $\alpha,\beta$-ethylenically unsaturated is first reacted with a glycol to about the extent necessary to form a monoglycol ester, i.e. to reduce the acid number of the reaction mixture by about one half. This reaction does not involve the elimination of water and is carried out under mild heating, e.g. at a temperature of about 120 to 150° C. An $\alpha,\beta$-ethylenically unsaturated acid, which may be in its anhydride form, is then added to the partly reacted mixture and the reaction is continued until the desired polyester is produced. Preferably, during the continuation of the reaction, after the $\alpha,\beta$-ethylenically unsaturated acid has been added to the reaction mixture containing the monoglycol ester, the reaction mixture is subjected to mild vacuum and then to high vacuum as described above. However, if desired, the previously mentioned high-sparge method, or the conventional method involving moderate sparging and no mild vacuum, may be employed in the practice of this aspect of the invention. In any event, by changing the method of addition of the reactants in accordance with this aspect of the invention there are produced polyester resins which when copolymerized with styrene or other unsaturated monomer in a manner well known in the art, yield products of substantially improved resistance to attack by chemicals as compared with products made by incorporating the $\alpha,\beta$-ethylenically unsaturated anhydride at the beginning of the reaction. This increased chemical resistance is particularly noticeable when the molar ratio of $\alpha,\beta$-ethylenically unsaturated dicarboxylic acid to other dicarboxylic acid or acids is more or less equimolecular.

As previously indicated, in their usual commercial applications the ethylenically unsaturated polyester resins, and particularly those polyester resins containing $\alpha,\beta$-enal groups, i.e.

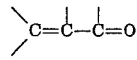

groups, are blended with styrene or other unsaturated monomers well known in the art, e.g. vinyl acetate, methyl methacrylate, vinyl toluene, diethyl fumarate or diallyl phthalate, or with mixtures of said monomers, particularly styrene-containing mixtures, to produce compositions which, on copolymerization, by means of heat or an appropriate catalyst such as benzoyl peroxide, methyl ethyl ketone peroxide or cyclohexanone peroxide, yield infusible and insoluble products. The polyester resins produced by the processes of this invention may be employed in the same manner.

The following examples are given to illustrate this invention further.

EXAMPLE I 110 moles of propylene glycol are mixed with 50 moles of chlorendic acid (hexachloroendomethylenetetrahydrophthalic acid obtained by reacting maleic anhydride and hexachlorocyclopentadiene) and 50 moles of maleic anhydride in an opaque reaction vessel and heated while carbon dioxide is bubbled through the mixture at the rate of 2.5 cc. (measured at standard conditions of temperature and pressure) per pound of mixture per minute. Throughout the process any vapors arising from the reaction mixture are passed upwardly through a steam-jacketed condenser maintained at a temperature of about 105° C. and then downward through water-cooled condenser maintained at a temperaure of about 15° C. to a receiver. Heating is continued until the temperature of the reaction mixture is 160 to 165° C., which temperature is maintained throughout the remainder of the process. When the acid number of the reaction mixture is reduced to 85, the whole system is placed under a subatmospheric pressure of 575 mm. of mercury absolute. Heating and sparging with carbon dioxide is continued while the pressure is reduced in stages of 100 mm. of mercury per stage at hourly intervals until, after 5 hours of reaction, when the acid number of the reaction mixture has been reduced to 40, the system is placed under a subatmosphere pressure of 10 mm. of mercury absolute. After a total reaction time of 12½ hours the product has an acid number of 20. The product is mixed with 3/7 of its weight of monomeric styrene to form a blend which is copolymerized to a hard infusible, insoluble fire-resistant solid by heating in the presence of benzoyl peroxide. The blend, before copolymerization, has an APHA color of 50.

EXAMPLE II 4.4 moles of propylene glycol are mixed with 2.0 moles of phthalic anhydride in an opaque vessel and heated while carbon dioxide is bubbled through the mixture at the rate of 3 standard cc. per pound of mixture per minute. Throughout the process any vapors arising from the reaction mixture are passed upward through a steam-jacketed condenser maintained at a temperature of about 105° C., and then downward through a water-cooled condenser maintained at a temperature of about 15° C. When the temperature of the reaction mixture reaches 145° C., 2.0 moles of maleic anhydride are added and the rate of supply of carbon dioxide is increased to 500 times its previous level for five minutes to insure the removal of all of the air which may be present. The rate of carbon dioxide supply is reduced to its former level and heating is continued until the temperature of the reaction mixture is 200° C., which temperature is maintained throughout the remainder of the process. When the acid number of the reaction mixture is reduced to 95, the whole system is placed under a subatmospheric pressure of 450 mm. of mercury absolute. After one hour, at an acid number of 60, the pressure is reduced to 15 mm. of mercury absolute, with the rate of carbon dioxide supply maintained at 3 standard cc. per pound of mixture per minute. After a total reaction time of 4½ hours the product has an acid number of 25. The product is cooled and mixed with 3/7 of its weight of monomeric styrene to form a blend which is copolymerized to a hard infusible, insoluble solid by heating in the presence of benzoyl peroxide.

The chemical resistance of the copolymerization product thus obtained is tested by immersing the product in a 2% aqueous solution of "Calgonite" (an alkaline detergent containing sodium hexametaphosphate) at a temperature of 93° C. for a period of seven days. The results observed at various intervals are given below, under the heading "I." Under the heading "II" there are given the results obtained with a product prepared in an identical manner except that the maleic anhydride is mixed initially with the phthalic anhydride and propylene glycol instead of being added later.

*Appearance of product*

|  | I | II |
| --- | --- | --- |
| Initial | high gloss, smooth | high gloss, smooth. |
| 1 day | no change | very slight surface attack. |
| 3 days | very slight surface attack | bad surface attack, cloudy. |
| 7 days | surface attack | cracked, opaque. |

It is to be understood that the foregoing detailed description is merely given by way of illustration and that many variations may be made therein without departing from the spirit of our invention.

Having described our invention, what we desire to secure by Letters Patent is:

1. Process for the production of polyester resins, which comprises esterifying, at any elevated esterification temperature, a glycol and an $\alpha,\beta$-ethylenically unsaturated dicarboxylic acid of about 4 carbon atoms, said mixture being one which, on reaction, forms a polyester resin containing α,β-enal groups, and during said esterification subjecting the heated esterification mixture to a subatmospheric pressure of 100 to 650 mm. of mercury absolute for at least an hour.

2. Process as set forth in claim 1 in which an inert gas is passed through said esterification mixture while said esterification mixture is under said subatmospheric pressure.

3. Process as set forth in claim 2 in which the esterification mixture is thereafter subjected to a subatmospheric pressure below about 35 mm. of mercury absolute.

4. Process as set forth in claim 2 in which the dicarboxylic acid comprises maleic acid.

5. Process as set forth in claim 4 in which the dicarboxylic acid comprises maleic acid and which a chlorine-containing acid is also present in said esterification mixture.

6. Process as set forth in claim 5 in which said chlorine-containing acid comprises hexachloroendomethylenetetrahydrophthalic acid.

7. Process as set forth in claim 4 in which the esterification mixture is thereafter subjected to a subatmospheric pressure below about 35 mm. of mercury absolute.

8. Process as set forth in claim 7 in which the pressure is reduced gradually from a level of 500 to 600 mm. of mercury absolute during said esterification.

9. Process as set forth in claim 1 in which the esterification temperature is about 160° to 210° C.

10. Process as set forth in claim 9 in which the esterification temperature is about 160° to 210° C.

11. Process for the production of polyester resins, which comprises esterifying, at an elevated esterification temperature, propylene glycol and maleic acid, and during said esterification subjecting the heated esterification mixture to a subatmospheric pressure of 100 to 650 mm. of mercury absolute for at least an hour while passing an inert gas through said esterification mixture.

12. Process for the production of polyester resins which comprises esterifying at an elevated temperature of about 160° to 170° C. a mixture consisting essentially of propylene glycol, maleic acid and hexachloroendomethylenetetrahydrophthalic acid while bubbling carbon dioxide through the esterification mixture, reducing the pressure on the esterification mixture during said esterification to about 500 to 600 mm. of mercury absolute and then gradually reducing said pressure to below about 35 mm. of mercury absolute and continuing the esterification at said elevated temperature until the acid number of the mixture is about 20 to 30, the esterification mixture being maintained at a subatmospheric pressure above 100 mm. of mercury absolute for at least an hour.

13. Process for the production of polyester resins which comprises esterifying at an elevated temperature of about 180° to 210° C. a mixture consisting essentially of propylene glycol, maleic acid and phthalic acid while bubbling carbon dioxide through the esterification mixture, reducing the pressure on the esterification mixture during said esterification to about 400 to 650 mm. of mercury absolute and then further reducing said pressure to below about 35 mm. of mercury absolute and continuing the esterification at said elevated temperature until the acid number of the mixture is about 20 to 30, the esterification mixture being maintained at a subatmospheric pressure above 100 mm. of mercury absolute for at least an hour.

References Cited in the file of this patent
UNITED STATES PATENTS

| | | |
|---|---|---|
| 2,410,073 | Howard | Oct. 29, 1946 |
| 2,865,891 | Michel | Dec. 23, 1958 |

FOREIGN PATENTS

| | | |
|---|---|---|
| 296,073 | Great Britain | Oct. 29, 1946 |
| 727,790 | Great Britain | Apr. 6, 1955 |

OTHER REFERENCES

Robitschek et al.: Ind. Eng. Chem. 46, 1628–32, August 1954.

Bjorksten: "Polyesters," pages 39, 42, 202, Reinhold (1956).